Jan. 3, 1956 G. C. MAPELSDEN ET AL 2,729,696
THREE CONDUCTOR RIP CORD
Filed June 29, 1955
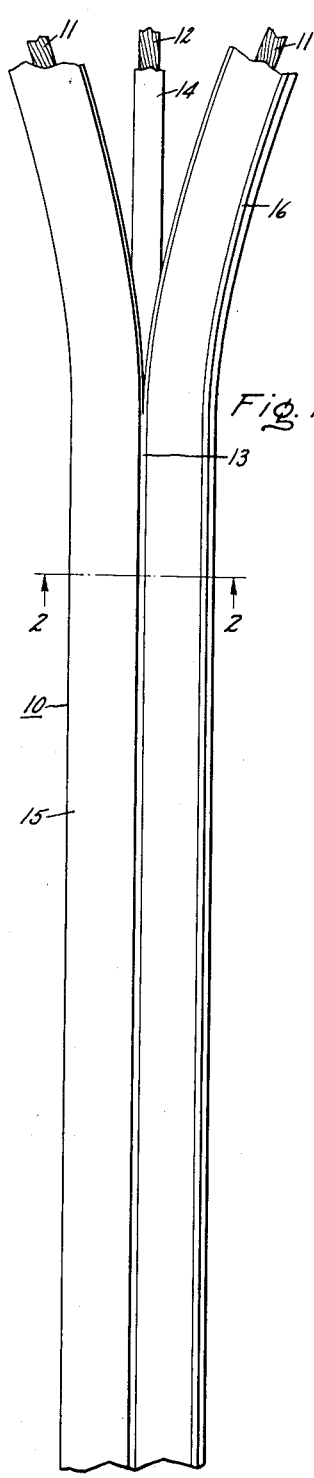
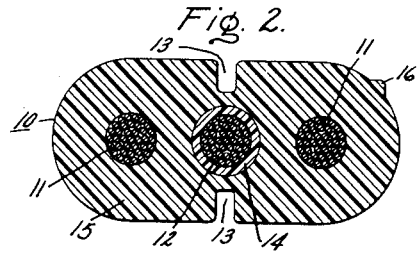
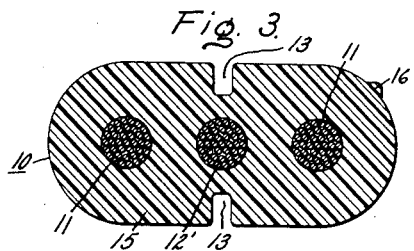
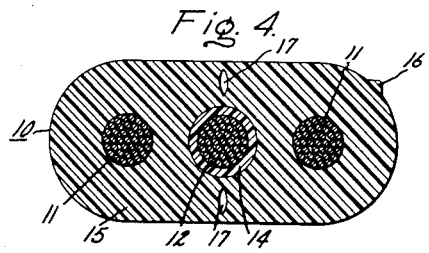
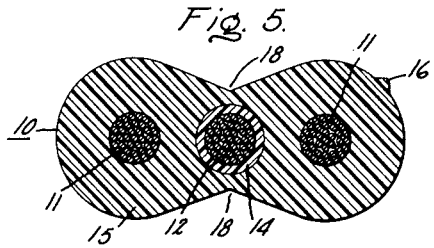
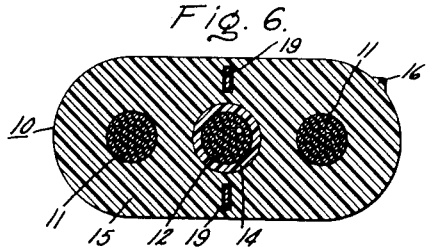
Inventors:
George C. Mapelsden,
Clifford O. Hull,
by Allard A. Braddock
Their Attorney.

United States Patent Office 2,729,696
Patented Jan. 3, 1956

2,729,696

THREE CONDUCTOR RIP CORD

George C. Mapelsden, Easton, and Clifford O. Hull, Stratford, Conn., assignors to General Electric Company, a corporation of New York Application June 29, 1955, Serial No. 518,714

9 Claims. (Cl. 174—117)

This invention relates to an improved portable electric cord and in particular to a novel type of flat cord having three parallel conductors embedded in a suitable sheathing material with the grounding or neutral conductor at the center and the two circuit conductors equally spaced therefrom. Disposed over and under the center conductor in the preferred embodiment is a cooperating pair of longitudinally extending grooves to permit the easy separation of the circuit conductors as well as to provide a means to quickly uncover or strip the center conductor when the longitudinal grooves are ripped open to make the necessary terminal connections.

This application is a continuation-in-part of our original application Serial No. 472,070, filed November 30, 1954, and assigned to the same assignee as is this application, which is now abandoned.

The rip cord of this invention is disclosed as it affects the installation of room air conditioners and the construction of the power supply cords which are furnished therewith but it should be appreciated at the outset that this invention is not limited in its use to any particular electrical apparatus and that it has general utility in the wiring industry wherever it is found expedient to use a portable electrical cord having two or more parallel conductors where one of the conductors is grounded or is operating at ground potential, and where the size, appearance and the ease of stripping the conductors are important considerations in the selection of the proper cord.

Until recently, the manufacturers of room air conditioners have had to use for the power supply cords a type S cord having separately insulated conductors twisted together with the empty spaces filled with jute or paper twine to form a round assembly and an outer jacket of rubber or similar insulating material. This type of cord has been severely criticized by the manufacturers of room coolers because it is costly to manufacture and it has a very bulky appearance as compared with the ordinary portable cords used in the home. Attempts have been made to improve the appearance of such cords by substituting outer jackets of thermoplastic materials that are available in many different pastel shades to harmonize with the arrangement of the colors of the various types of room coolers and similar home appliances.

At the present time the National Electrical Code requires that all room coolers be grounded on first floor installations since in many installations it is possible for a person to be standing out-of-doors on wet ground and touch the metal housing of a room cooler mounted in a low window which could result in serious personal injury. The code also insists on grounding room coolers when they are located in close proximity to grounded fixtures such as radiators and the like. Likewise, there are many municipalities which have their own local electric codes which require the grounding of all room coolers regardless of their location. Consequently, it should be appreciated that a three conductor power supply cord would satisfy a large percentage of the market of the cords for room coolers.

In the preferred embodiment of the present invention the three conductors are embedded in a unitary mass of suitable resilient insulating material to lie parallel and in a single plane. The grounding conductor is in the center of the cord and between two central longitudinal grooves in the insulation of the cord so that when the grooves are ripped apart, the grounding conductor is exposed and readily accessible for making terminations.

The principal object of this invention is to provide a novel electrical cord having two or more conductors and means for facilitating the ease of stripping one of the conductors.

A further object of this invention is to provide a novel flat three conductor cord of minimum over-all dimensions for the size of the conductors and the amount of current to be carried by the cord.

A further object of this invention is to provide a novel rip cord having at least two parallel conductors where one of the conductors is located between a pair of longitudinal grooves in the insulation of the cord to be in a weakened stripping plane so that when the grooves are split apart the exposed portion of the said one of the conductors will be freed from the other conductors.

A broader object of this invention is to provide an electrical cord with three parallel conductors where the center conductor is located in a weakened stripping plane of reduced cross-section by forming voids, adding non-adherent tapes, or by forming depressions or grooves, so that the center conductor may be readily exposed when the outer conductors are split apart.

A further object of this invention is to provide a flat three conductor rip cord wherein the center conductor is in effect insulated until the cord is ripped open for making the necessary termination.

A further object of this invention is to provide a flat three conductor rip cord wherein the center grounding conductor once exposed cannot be mistaken for a circuit conductor.

A further object of this invention is to provide a flat three conductor rip cord wherein the geometric location of the center conductor is such that said conductor is well protected against mechanical injury.

Our invention will be better understood from the following description taken in connection with the accompanying drawing and its scope will be pointed out in the appended claims.

Figure 1 is a plan view showing a section of a flat three conductor rip cord embodying our invention with the outer circuit conductors being spread apart at one end of the cord to expose the center grounding or neutral conductor.

Figure 2 is a cross-sectional view of the cord of Figure 1.

Figure 3 is a cross-section of a modification of the cord of Figure 2 showing a bare grounding or neutral conductor which is marked or covered by a suitable means to indicate its intended function.

Figure 4 is a cross-sectional view of a third modification showing voids formed in the insulation above and below the center conductor so that the conductor is in a weakened stripping plane.

Figure 5 is a cross-sectional view of a fourth modification of our invention showing a three conductor parallel cord where the longitudinally-extending ripping grooves are enlarged to produce the over-all configuration of a figure eight.

Figure 6 is a cross-sectional view of a fifth modification showing flexible separator tapes such as paper or a suitable fabric above and below the center conductor to locate the conductor in a weakened stripping plane.

Referring to the drawing, wherein like elements are represented by the same reference numerals in the different views and, in particular to Figure 2, 10 represents a flat three conductor rip cord having parallel conductors of which the two outer conductors 11 are circuit conductors while the center conductor 12 is the grounding or neutral conductor of the cord. The conductors are insulated by the extrusion of a suitable thermoplastic insulating material 15 thereover such as polyvinyl chloride. It should be appreciated however that this invention is not limited to the use of such a material and that an elastomeric compound could also be used. It is of great importance to note that the grounding or neutral conductor 12 is located between a pair of longitudinally extending grooves 13 which are located on the top and bottom of the cord. A very thin coating 14 of thermoplastic material covers the conductor 12 but its function is to provide a relatively permanent identification means which will not tend to fray or wear off when the center conductor is exposed after the separation of the two circuit conductors 11. Possible substitutes for the thermoplastic covering 14 would include paper and cotton tape and similar fibrous materials in tape or braided form. It is a requirement of the National Electrical Code that the grounding conductor such as the one disclosed herein shall be readily identified by being marked with a green color, and the covering 14 is so colored. If the center conductor 12 is to be used as a current-carrying conductor operating at ground potential and commonly known in the art as a neutral conductor, the code requires that such a neutral conductor be identified by a white or natural gray coloring.

A longitudinal rib 16 is formed at one side of the cord to provide polarity identification as is quite common in this art. In the manufacture of the cord, steps are taken to prevent the adhesion of the covering 14 with the insulation 15. This is accomplished by the use of either soapstone, talc, mica dust or a slipper compound such as a silicone emulsion applied over the surface of the covering 14 of the grounding conductor 12 immediately before the extrusion of the insulation 15 over the conductors 11 and 12.

It is however important in the commercial manufacture of cord sets for sale to the manufacturers of electrical apparatus such as room coolers, clothes dryers, electric ranges, and the like, that the grounding or neutral conductor be permanently identified. If a loose cotton wrap were applied over the grounding conductor and the cord sets were made up with a plug at one end with the other end being stripped and prepared for connection with the customers' machines, and then stacked and shipped in bulk, the cotton wrap might fray and perhaps tear off during shipment and storage. Accordingly, it is more satisfactory and economical to have an identification means on the grounding or neutral conductor which will not detract from the convenience and usefulness of the cord.

Referring now to Figure 1 of the drawing, it should be clear that when the grooves 13 are split open to separate the insulated conductors 11 the center grounding or neutral conductor 12 will be freed from the insulation 15 thereby making the conductor 12 readily accessible for making the necessary terminal connection. Also, it should be appreciated that the grounding or neutral conductor 12 can be looked upon as an insulated conductor until the cord is ripped open for termination.

As an example of a possible modification of the cord of Figure 2, Figure 3 shows a flat three conductor rip cord wherein the only change that has been made is that the center grounding or neutral conductor 12' is in effect bare having no covering other than the insulation 15. It is contemplated that it would be identified by a strip of paint, by using green or white copper strands or a suitable indicia so that it would be properly identified to meet the requirements of the National Electrical Code.

The present invention has been discussed as it pertains to ripping grooves for locating one of the conductors such as the center conductor in a weakened stripping plane, but it should be readily apparent that there are other constructions which are within the scope of this invention for making it possible to readily expose the center conductor. Figure 4 of the drawing shows a modification wherein voids 17 are formed in the insulation 15 above and below the center conductor so that once the end of the cord is split open, it is possible to readily expose the center conductor by pulling apart the two outer conductors. The reduced section of the insulating material which is formed by the presence of the voids 17 makes it possible to easily split open the center of the cord.

In Figure 5 of the drawing is another modification of our invention showing a species of ripping grooves which are enlarged to form wide V-shaped grooves 18 where the cord has an over-all configuration of a figure eight. This construction again places the center conductor in a weakened stripping plane so that when the two outer conductors are separated, the smallest cross-sectional area adjacent the center conductor will be split apart to expose that conductor.

A still further modification of this invention is shown in Figure 6 of the drawing wherein flexible tapes 19 of paper or other suitable fibrous or fabric materials are located on opposite sides of the center conductor without being bonded to the insulating material, so that when the outer conductors are separated, the center conductor as well as the tapes will be readily exposed.

Consequently, having described our invention of a novel construction for an electrical cord comprising weakened sections or grooves in the sheathing material to facilitate the ease of stripping of one of the conductors, it should be readily apparent to those skilled in this art that this invention is equally valuable in cords having two or more conductors, and where the conductor to be freely stripped is either a grounding conductor or a neutral conductor which operates at ground potential. A further possible modification would be to have the circuit conductors individually insulated and an outer sheathing material or jacket for supporting the grounding or neutral conductor with the other conductors. In this event the weakened sections or grooves would be in the sheathing material rather than in the insulating material. Also, it should be obvious that the ripping grooves could be offset slightly from a central location since it is mainly important that they be closely adjacent the conductor to be freely stripped. Thus, it will be seen that this invention resides in the fact that one of the conductors of a parallel cord is located within a weakened stripping plane where the insulating material is of a reduced cross-section adjacent the conductor so that it is an easy matter to separate the outer conductors while at the same time exposing the center conductor. Whether the reduced cross-sectional area adjacent the center conductor is formed by ripping grooves, voids, paper separator tapes or the like appears to be of no consequence, although the preferred embodiment of Figure 2 of the drawing is perhaps the easiest and most economical design to manufacture.

Modifications of this invention will occur to those skilled in this art and it is to be understood, therefore, that this invention is not limited to the particular embodiments disclosed but that it is intended to cover all modifications which are within the true spirit and scope of this invention.

What we claim as new and desire to secure by Letters Patent of the United States are:

1. An insulated electrical cord comprising at least three substantially coplanar conductors embedded in sheathing material in which longitudinal ripping grooves are oppositely disposed axially parallel with the center conductor, so that the center conductor lies in a weakened stripping plane and is readily exposed when the said grooves are ripped apart.

2. An insulated electrical cord comprising at least three substantially coplanar conductors embedded in a sheathing material with a longitudinally-extending ripping groove in the sheathing material above and below the center conductor, so that the center conductor lies in a weakened stripping plane and is readily separated from the sheathing material when the grooves are ripped apart.

3. An insulated electrical cord comprising at least two conductors in a generally parallel arrangement, with a longitudinally-extending ripping groove in the insulation above and below one of the conductors, so that the said one of the conductors lies in a weakened stripping plane and is readily separated from the insulation when the grooves are ripped apart.

4. An insulated electrical cord comprising three conductors embedded in a sheathing material to lie parallel and in a single plane, the center conductor being identified as a grounding conductor and located between longitudinally-extending ripping grooves in the sheathing material above and below the said grounding conductor, so that the grounding conductor lies in a weakened stripping plane and is readily separated from the sheathing material when the grooves are ripped apart.

5. An insulated electrical cord as recited in claim 4 wherein the center conductor is marked for identification purposes by a thin durable coating of an abrasion-resistant material.

6. An insulated electrical cord as recited in claim 5 wherein a thermoplastic material is used as the identification means over the center grounding conductor.

7. An insulated electrical cord comprising at least two parallel conductors embedded in sheathing material, with a reduced section of sheathing material above and below one of the conductors so that said one of the conductors lies in a weakened stripping plane and is readily exposed when the reduced sections are torn open.

8. An insulated electrical cord comprising three substantially coplanar conductors with a longtudinally-extending void formed in the insulation on opposite sides of the center conductor so that this conductor lies in a weakened stripping plane and is readily exposed when the outer conductors are separated from each other.

9. An insulated electrical cord comprising three substantially coplanar conductors embedded in sheathing material with a separator tape of flexible insulating material confined in the sheathing above and below the center conductor without being bonded to the sheathing material, whereby the center conductor is in a weakened stripping plane and is readily removed from the sheathing material along with the said tapes when the outer conductors are pulled apart.

References Cited in the file of this patent
UNITED STATES PATENTS

| | | |
|---|---|---|
| 1,984,038 | Shaw et al. | Dec. 11, 1934 |
| 2,149,002 | Wermine | Feb. 28, 1939 |
| 2,626,302 | Cox | Jan. 20, 1953 |
| 2,628,998 | Frisbie | Feb. 17, 1953 |